US006182650B1

(12) United States Patent
Tuttle

(10) Patent No.: US 6,182,650 B1
(45) Date of Patent: Feb. 6, 2001

(54) DUTCH OVEN STAND AND LID HOLDER

(76) Inventor: Ted A. Tuttle, St. George Plumbing, 1570 Parkview Dr., Santa Clara, UT (US) 84765

( * ) Notice: Under 35 U.S.C. 154(b), the term of this patent shall be extended for 0 days.

(21) Appl. No.: 09/556,679

(22) Filed: Apr. 21, 2000

Related U.S. Application Data

(60) Provisional application No. 60/139,729, filed on Jun. 18, 1999.

(51) Int. Cl.[7] ........................................................ F24B 3/00
(52) U.S. Cl. ............................. 126/30; 126/9 R; 248/164
(58) Field of Search .................................. 126/25 R, 29, 126/30, 9 R, 9 B, 40, 50; 248/164, 166, 163.2, 168, 188, 188.5, 431; 108/118, 132

(56) References Cited

U.S. PATENT DOCUMENTS

| 955,140 | * | 4/1910 | Cronk | 126/9 R |
|---|---|---|---|---|
| 2,841,352 | | 7/1958 | Pappas | 248/164 |
| 2,859,080 | | 11/1958 | Botnick | 311/83 |
| 3,286,705 | * | 11/1966 | Bedol | 126/9 R |
| 4,024,851 | | 5/1977 | Boda | 126/30 |
| 4,146,010 | * | 3/1979 | Manska | 126/30 |
| 4,705,250 | * | 11/1987 | Eastman | 248/164 |

* cited by examiner

*Primary Examiner*—James C. Yeung
(74) *Attorney, Agent, or Firm*—Richard C. Litman

(57) ABSTRACT

A Dutch oven assembly that includes an adjustable-height tripod stand which supports an easy-to-level, snap-in-place steel burner plate for a Dutch oven pot. Three solid steel rods form the tripod stand. The three rods intersect at a common point where they are bound by a metal washer so as to form a plane defined as a lower cone connected to a similar, inverted upper cone. Each rod has three annular grooves such that the metal washer and the stand are adjustable to three different heights. Each rod also has a segment of saw teeth disposed at its upper end. The burner plate rests horizontally, essentially inside the plane of the upper cone formed by the intersecting rods. The burner plate snaps in place between adjacent saw teeth. The saw teeth also enable the plate to be leveled where there is uneven terrain. Coals are placed on the burner plate, under and around the Dutch oven pot. The assembly includes two miniature tripod stands upon which rest the Dutch oven pot and lid for convenience.

9 Claims, 9 Drawing Sheets

DUTCH OVEN STAND AND LID HOLDER

CROSS-REFERENCE TO RELATED APPLICATION

This application claims the benefit of U.S. Provisional Patent Application Ser. No. 60/139,729, filed Jun. 18, 1999.

BACKGROUND OF THE INVENTION

1. Field of the Invention

The present invention relates to collapsible stands specifically, a collapsible, self-leveling Dutch oven stand and assembly.

2. Description of Related Art

The biggest complaint about Dutch ovens and cooking outdoors is that the user must bend over to cook, and after he or she is finished cooking, there is no place to place the pot or lid while serving the food. When Dutch oven s are provided with a stand, there is typically no way to adjust their height, or to level the pot on uneven terrain, nor are implement holders provided as part of the stand.

U.S. Pat. No. 2,859,080, issued to I. Botnick on Nov. 4, 1958, describes a collapsible table having a rotating top. The table top of the Botnick device cannot be leveled on uneven terrain and the table top sits on top of the rods rather than being inserted within the plane of the cone defined by the rods Furthermore, the rods of the Botnick device are fixed rather than adjustable and do not comprise saw teeth, nor setting grooves, nor base spikes. Moreover, there is no central handle for the table top and no place on the leg rods to hold cooking implements. Thus, Botnick does not teach or suggest the present invention as claimed.

U.S. Pat. No. 2,841,352, issued to A. J. Pappas on Jul. 1, 1958, describes a collapsible support device. The collapsible support device consists of a plurality of standards that are extended through a ring member having a spider mounted within it, and there is a standard pivotally secured to each leg of the spider.

U.S. Pat. No. 4,024,851, issued to R. A. Boda on May 24, 1977, describes a tripod cooking device. The tripod cooking device is of the pyramidal tripod type and utilizes a grill which hangs from the tripod apex. The tripod cooking device is easily assembled and disassembled.

None of the above inventions and patents, taken either singly or in combination, is seen to describe the instant invention as claimed.

SUMMARY OF THE INVENTION

Accordingly, it is a principal object of the invention to provide a Dutch oven assembly that will accommodate different sized plates and Dutch ovens.

It is another object of the invention to provide a Dutch oven stand that will remain stable on soil or concrete, and other types of surfaces.

It is a further object of the invention to provide a Dutch oven tripod stand that can be set up on uneven terrain so as to be levelable.

Still another object of the invention is to provide a Dutch oven stand having grooves and notches to accommodate a burner plate that can thereby be made level.

Yet another object of the invention is to provide a tripodal Dutch oven stand having an adjustable washer ring to accommodate different sized Dutch ovens.

Still another object of the invention is to provide a Dutch oven stand having implement holders on the legs of the stand.

It is an object of the invention to provide improved elements and arrangements thereof in a Dutch oven assembly for the purpose described which is inexpensive, dependable and fully effective in accomplishing its intended purposes.

The present invention is a Dutch oven assembly that includes a three-rod adjustable-height tripod stand which supports an easy-to-level, snap-in-place burner plate for a Dutch oven. Three solid steel rods form a tripod-type stand. The three rods intersect at a central point where they are bound by a metal washer so as to form a plane defined as a lower cone connected to a similar, inverted upper cone.

Each rod has three annular grooves representing three alternative locations for the metal washer such that the stand is adjustable to three respective heights. By sliding the washer up or down along the rods, the stand will accommodate different sized Dutch ovens.

Each rod also has a linear segment of saw teeth disposed at its upper end. The burner plate rests horizontally, essentially inside the plane of the upper cone. The burner plate is pressed into the plane of the upper cone so as to "snap" in place between adjacent saw teeth. The saw teeth also enable the plate to be leveled where there is uneven terrain. Oppositional forces imposed by the ground at the bottom end of the rods, and by the burner plate near the top end of the rods, result in the rods being frictionally bound by the washer. As more weight is loaded onto the burner plate, the stand becomes tighter at the main washer point.

Each rod has a sharpened base, for insertion into the ground, extending approximately 1 inch beyond a ring-shaped shoe. The base and the shoe provide further stability. Each rod has a top end having an S-shaped bend so as to support all the implements needed for cooking outdoors.

Coals are placed on the burner plate, under and around a Dutch oven pot. The present invention is an assembly, including two miniature tripod stands upon which is placed the Dutch oven pot and lid for serving food. The Dutch oven may also be placed directly onto the stand, without the burner plate, in which case the saw teeth will bite and secure the lower edges of the Dutch oven pot.

These and other objects of the present invention will become readily apparent upon further review of the following specification and drawings.

DETAILED DESCRIPTION OF THE PREFERRED EMBODIMENTS

Figure 1:
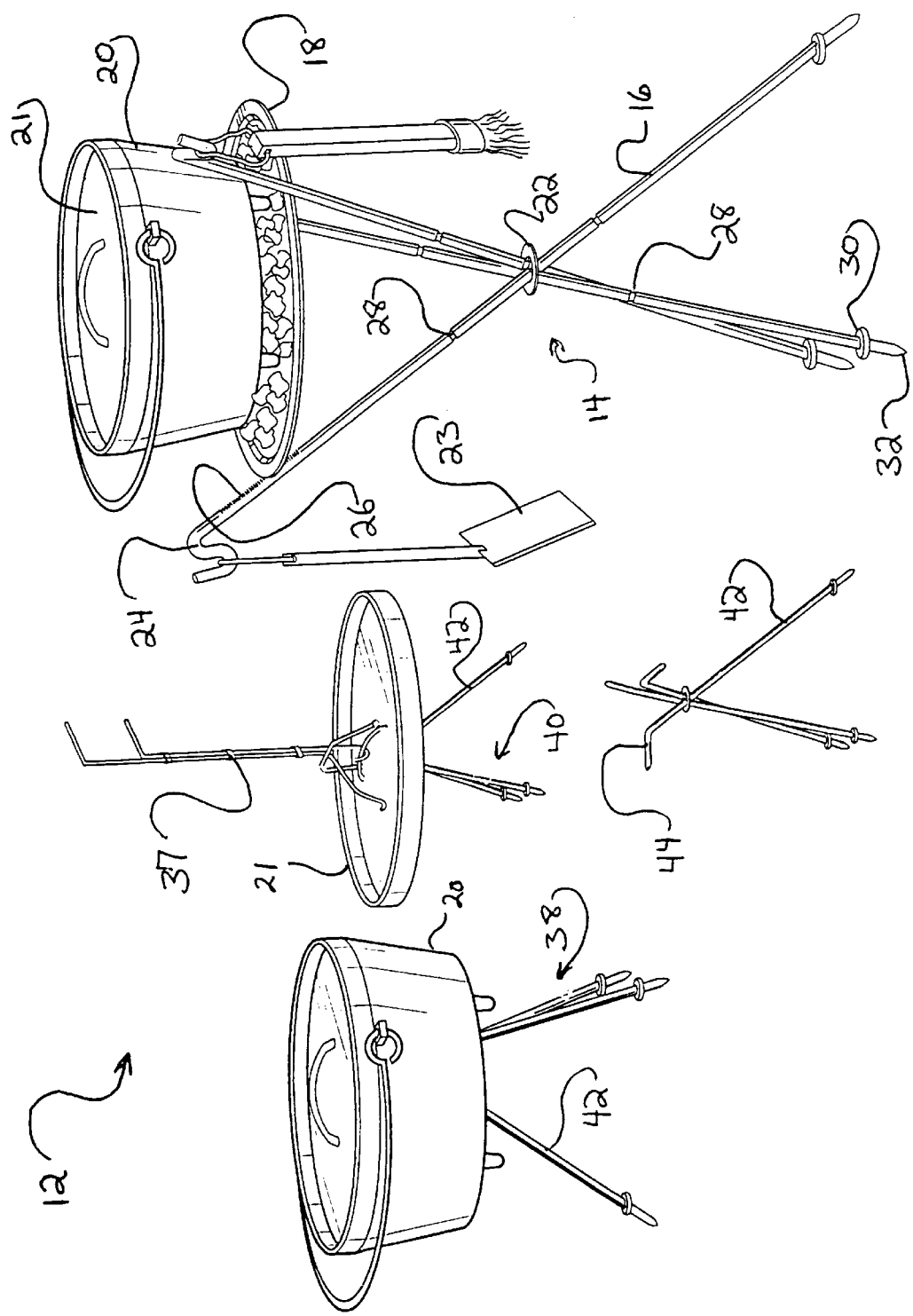
FIG. 1 is an environmental perspective of the preferred Dutch oven stand, burner plate, and lid assembly.

The present invention, as best shown in FIG. 1, is a Dutch oven stand assembly 12 including an adjustable-height tripod 14 which supports an easy-to-level, snap-in-place burner plate 18 supporting a Dutch oven pot 20 and lid 21. Burner plate 18 is flat and circular in shape, preferably made from 10 gauge steel, and preferably has an 18 inch diameter, although other sizes may be used in conjunction with assembly 12. Preferably, plate 18 should be at least two inches wider, in diameter, than pot 20.

Figure 4:
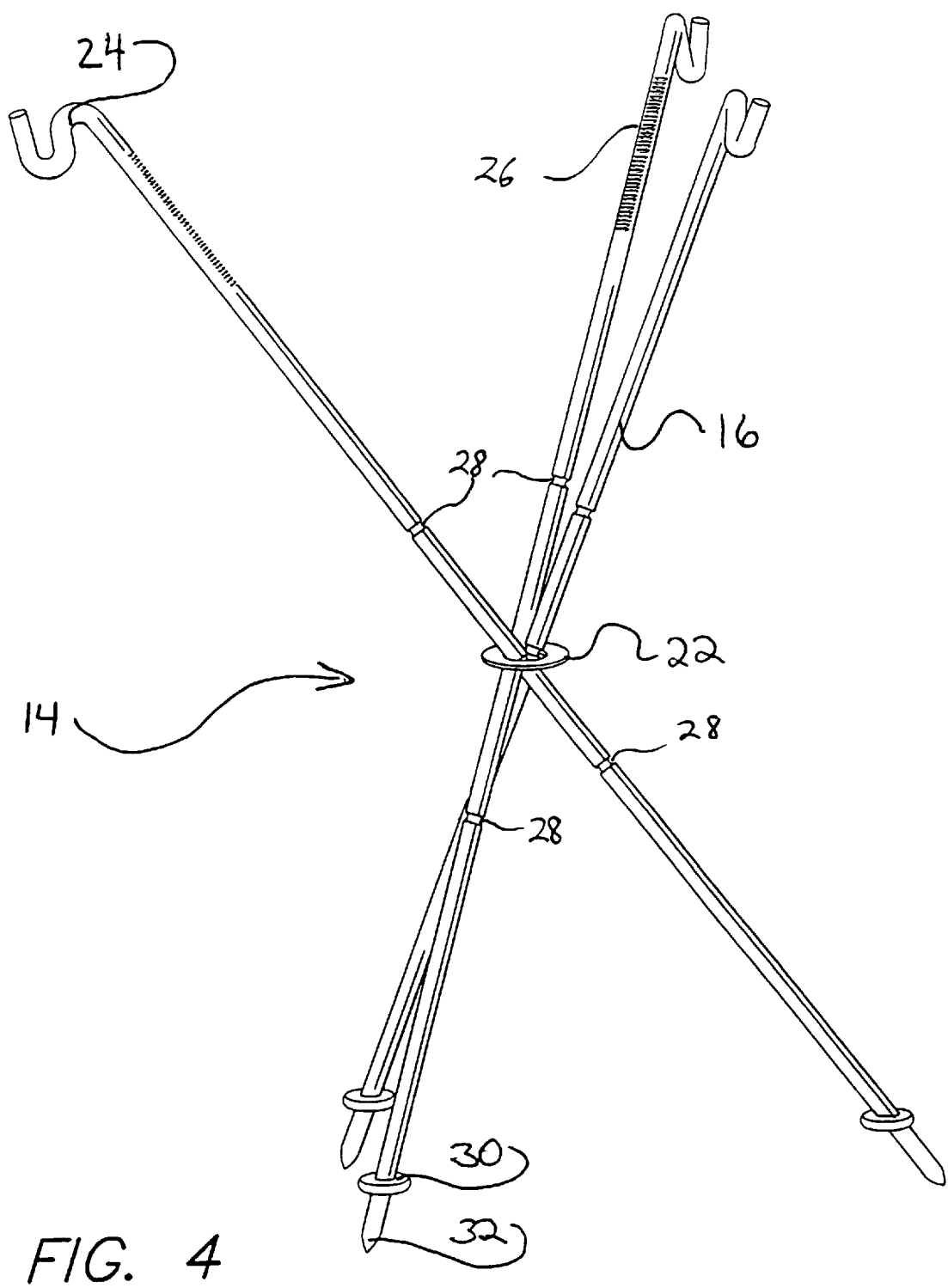
FIG. 4 is a perspective view of the Dutch oven tripod stand.

Tripod 14, best shown in FIG. 4, is essentially comprised of three steel rods 16 bound by a metal washer 22. Rods 16 preferably have a 7/16 inch diameter and are forty-one inches in length. Washer 22 preferably has an inside diameter of 7/8 inches, which is a critical dimension that is based upon the 7/16 inch preferred rod diameter. Washer 22 preferably has a 2¼ inch outside diameter.

Each rod 16 has a top portion 24 forming an S-shaped handle for hanging cooking implements, such as a ladles, a coal stirrer, a spatula 23, a lid lifter 37, and tongs. Rod 16 has an approximately eight to twelve-inch upper portion of saw teeth 26. Saw teeth 26 are spaced approximately ¼ inch apart along the upper portion of an inside surface of each rod.

Rod 16 has a middle portion having a plurality of annular grooves 28. Grooves 28 are approximately four inches apart with the middle groove being close to the center of each rod 16. Grooves 28 represent three alternative locations for metal washer 22 such that tripod 14 is adjustable to three respective heights. Adjusting of Tripod 14 is accomplished while tripod is in its collapsed position best shown in FIG. 5. By sliding washer 22 up or down along rods 16, tripod 14 may accommodate varying-sized plates 18.

Figure 2:
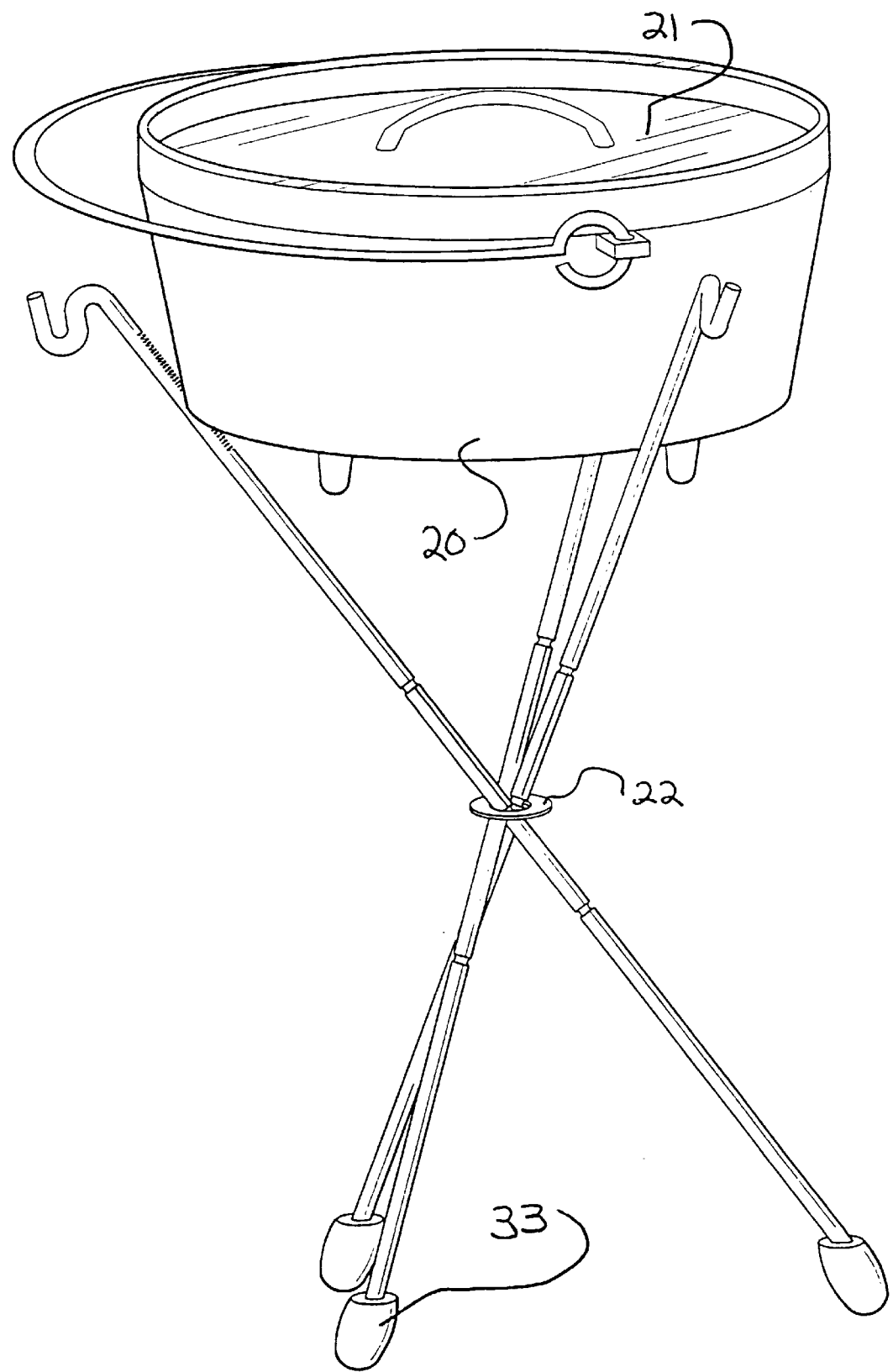
FIG. 2 is a perspective view of the Dutch oven stand after removal of the burner plate, also showing alternate base of hard rubber boots.

A lower portion of rod 16 comprises a disc-shaped shoe 30, and a sharpened stake 32 extend approximately 1 inch below shoe 30. Shoe 30 preferably has an outside diameter of 1⅜". The lower portion of rod 16 extends 1 inch through shoe 30 so that rod 16 can spike into the ground. In an alternative embodiment, as shown in FIG. 2, where placement of assembly 12 is on a hard surface such as concrete, a hard rubber boot 33 may be substituted for both disc-shaped shoe 30 and stake 32.

Figure 3:
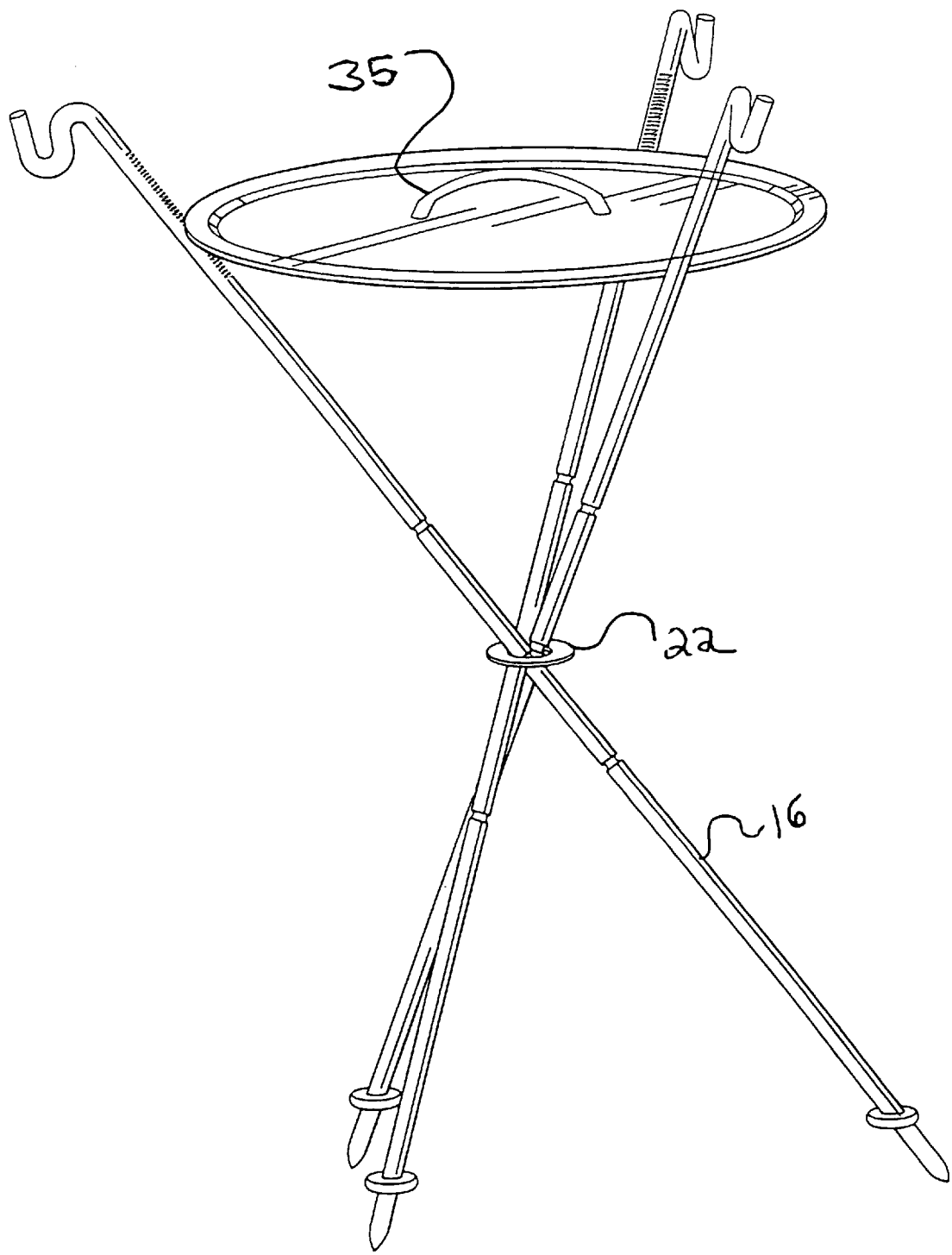
FIG. 3 is a perspective view of the Dutch oven stand and burner plate after removal of pot.

Burner plate 18 is insertable into the plane of the upper cone formed by rods 16. A steel handle 35 of plate 18, best shown in FIG. 3, is disposed centrally on an upper surface of plate 18, enabling easy removal of plate 18 with lid lifter 37 or other appropriate tool. Plate 18 sets into tripod 14 with the plate 18 engaging saw teeth 26, the Dutch oven pot 20 resting on top of plate 18. The saw teeth 26 lock the burner plate 18 securely into place. Thus, when cooking with plate 18, pot 20 is conveniently at waist height. Plate 18 locks into place between saw teeth 26 on each rod 16, and is thereby stabilized and secured into place. Plate 18 may be leveled by adjusting the point at which plate 18 intersects saw teeth 26 on one or more of rods 16.

Figure 6:
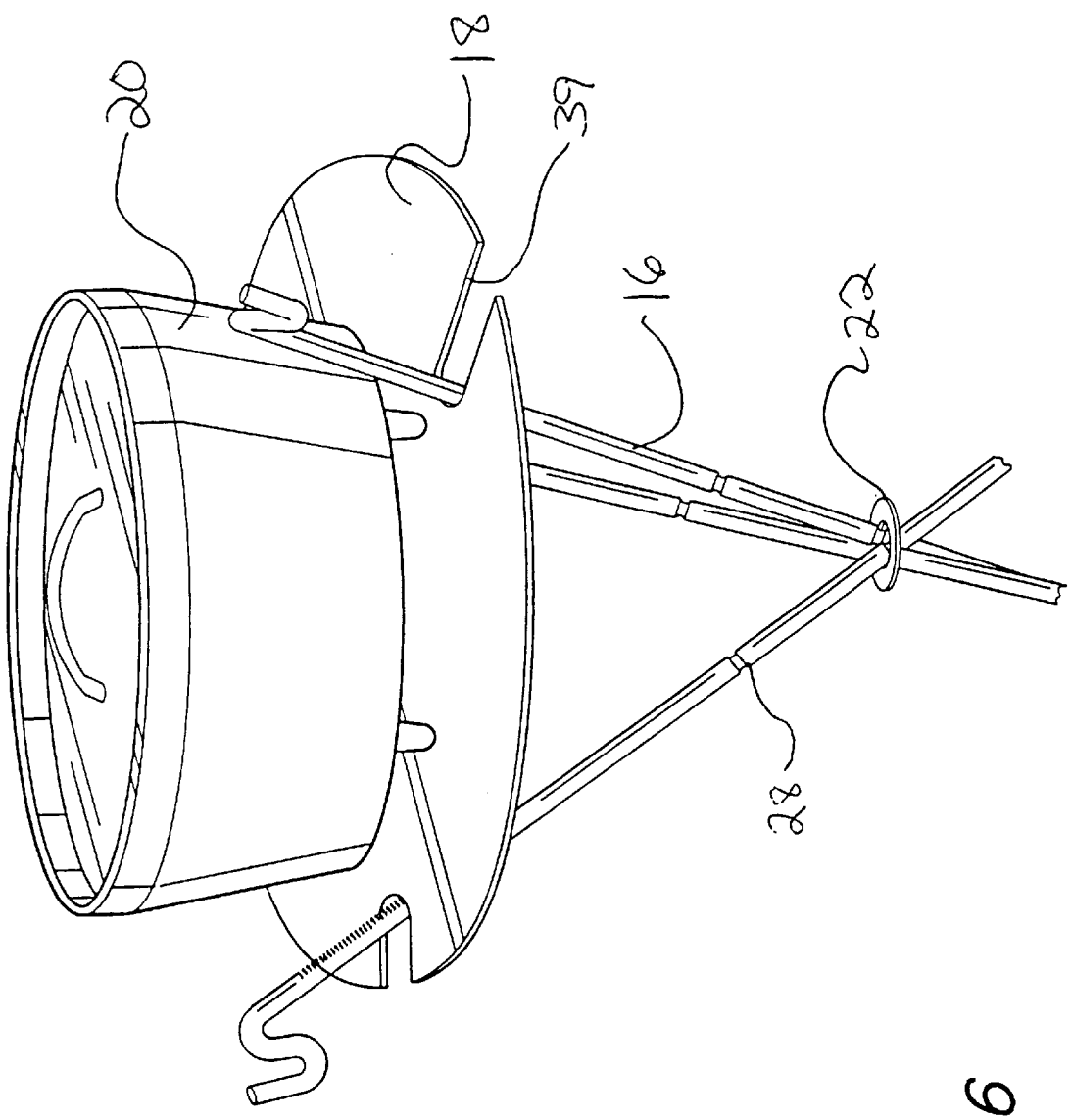
FIG. 6 is a perspective view of an alternate embodiment of the Dutch oven where the burner plate has half moon cut outs to provide a wider surface for the coals.

FIG. 6 shows an alternate embodiment of plate 18 having half-moon cut outs 39 to accommodate a wider plate 180.

Figure 7:
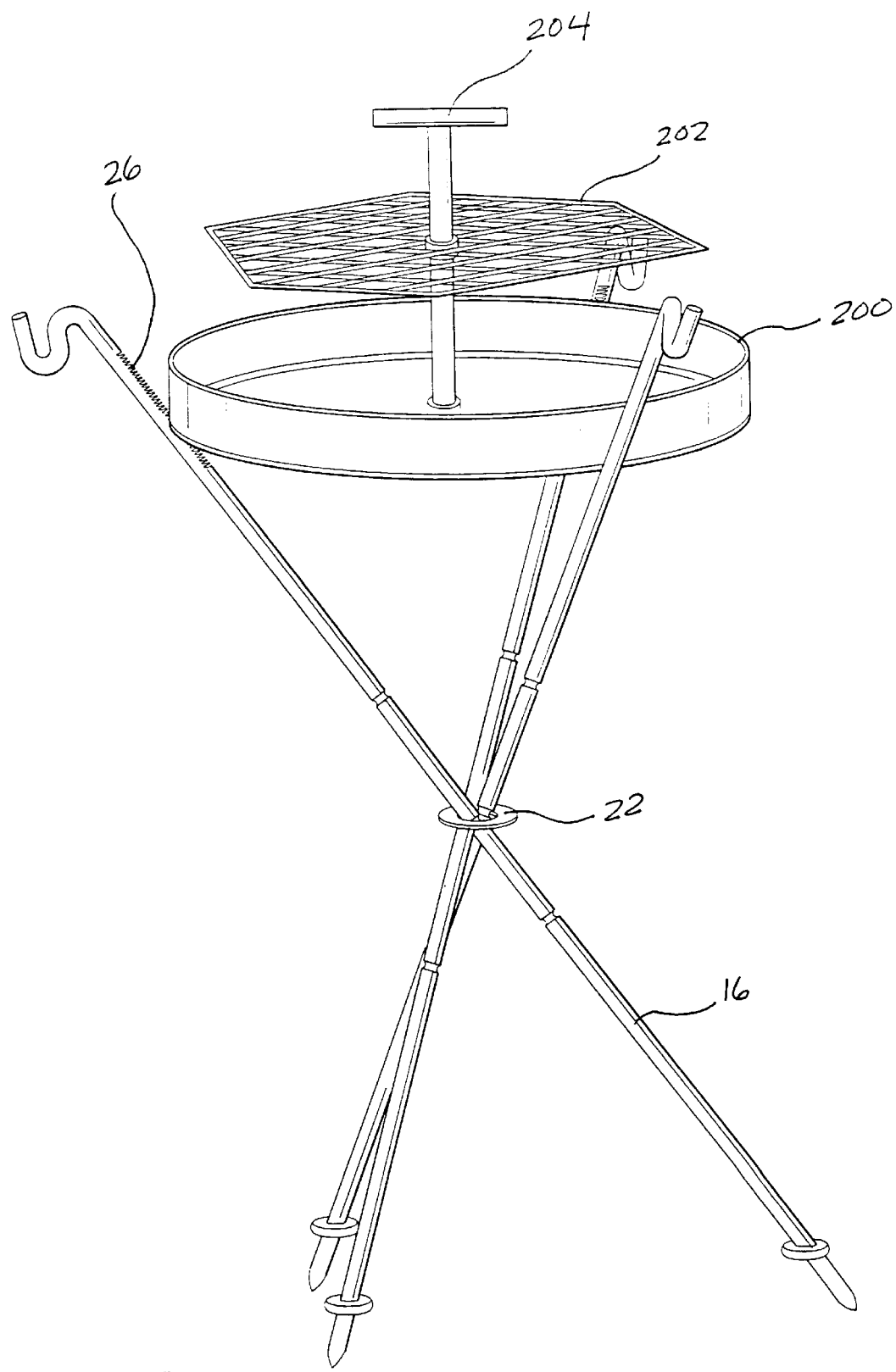
FIG. 7 is a perspective view of a safety ring and barbecue grate on the Dutch oven tripod stand.
Figure 8:
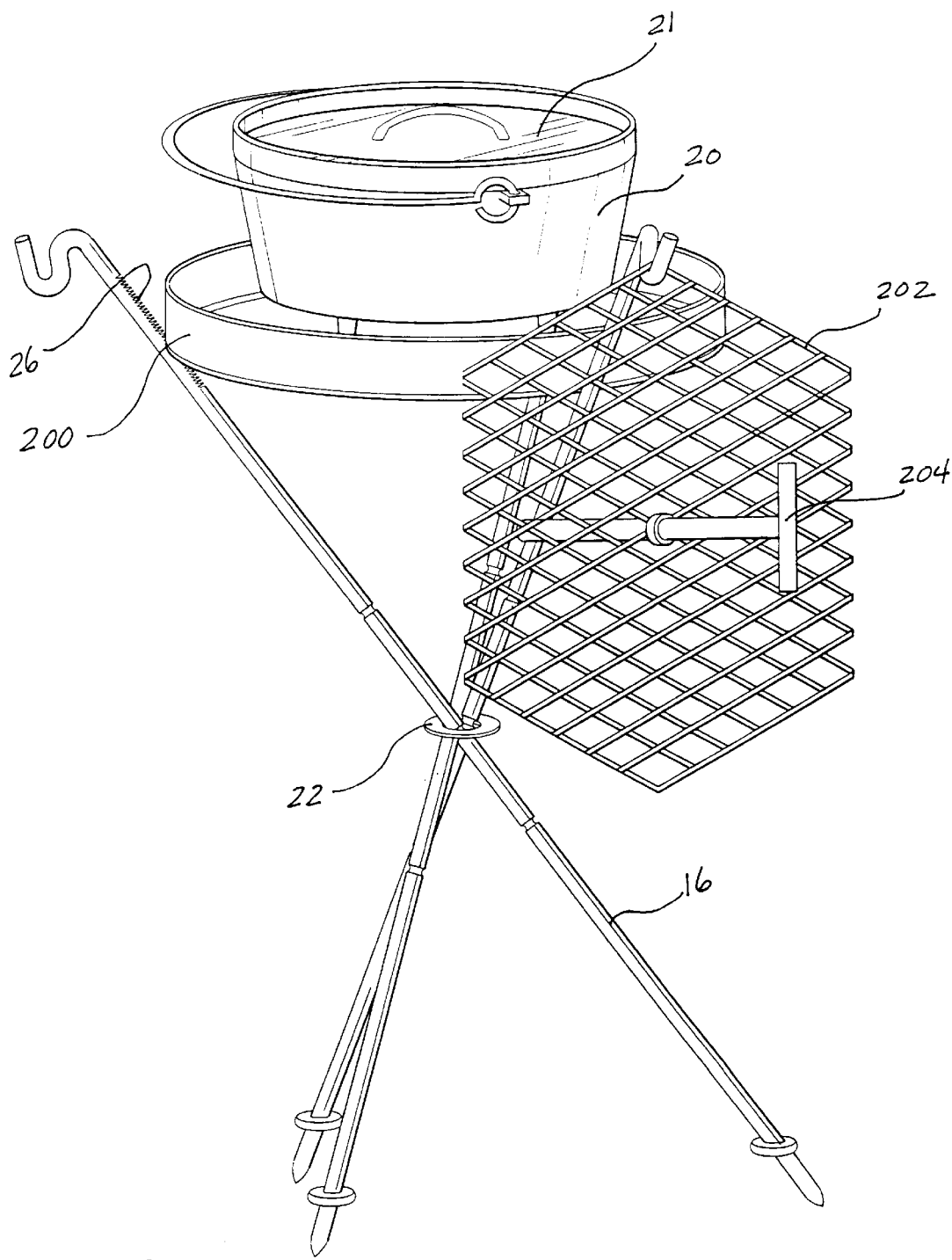
FIG. 8 is a perspective view of the pot in the safety ring on the dutch oven tripod stand.

FIG. 7 is a perspective view of a safety ring 200 and barbecue grate 202 on the Dutch oven tripod stand 14. The circular safety ring 200 is designed to ensure the stability of the pot 20 on the tripod stand 14 and to increase the margin of safety against accidentally tipping over the Dutch oven pot 14. The safety ring 200 also functions as a barbecue grill when the barbecue grate 202 is stored as depicted in FIG. 8. A T-shaped threaded rod 204 disposed in the center of the safety ring 200 and the barbecue grate 202 functions as a height adjustment means 204 to adjust the height of the barbecue grate 202 over the safety ring 200. The convenient height adjustment means 204 makes it have easy to insert and remove charcoals (not shown) from the safety ring 200 when the safety ring 200 is used as a barbecue grill. The barbecue grate 202 and the height adjusting means 204 can be made of amy suitable metal, for example, steel.

FIG. 8 is a perspective view of a Dutch oven pot 20 in the safety ring 200 on the dutch oven tripod stand 14. The safety ring 200 not only provides the Dutch oven pot 20 with an extremely stable base but also serves as to collect any spillage of the contents of the Dutch oven pot 20. The saw teeth portion 26 of the rods 16 locks the safety ring 200 securely into place. The safety ring 200 can be made of any suitable metal, for example, steel.

Figure 9:
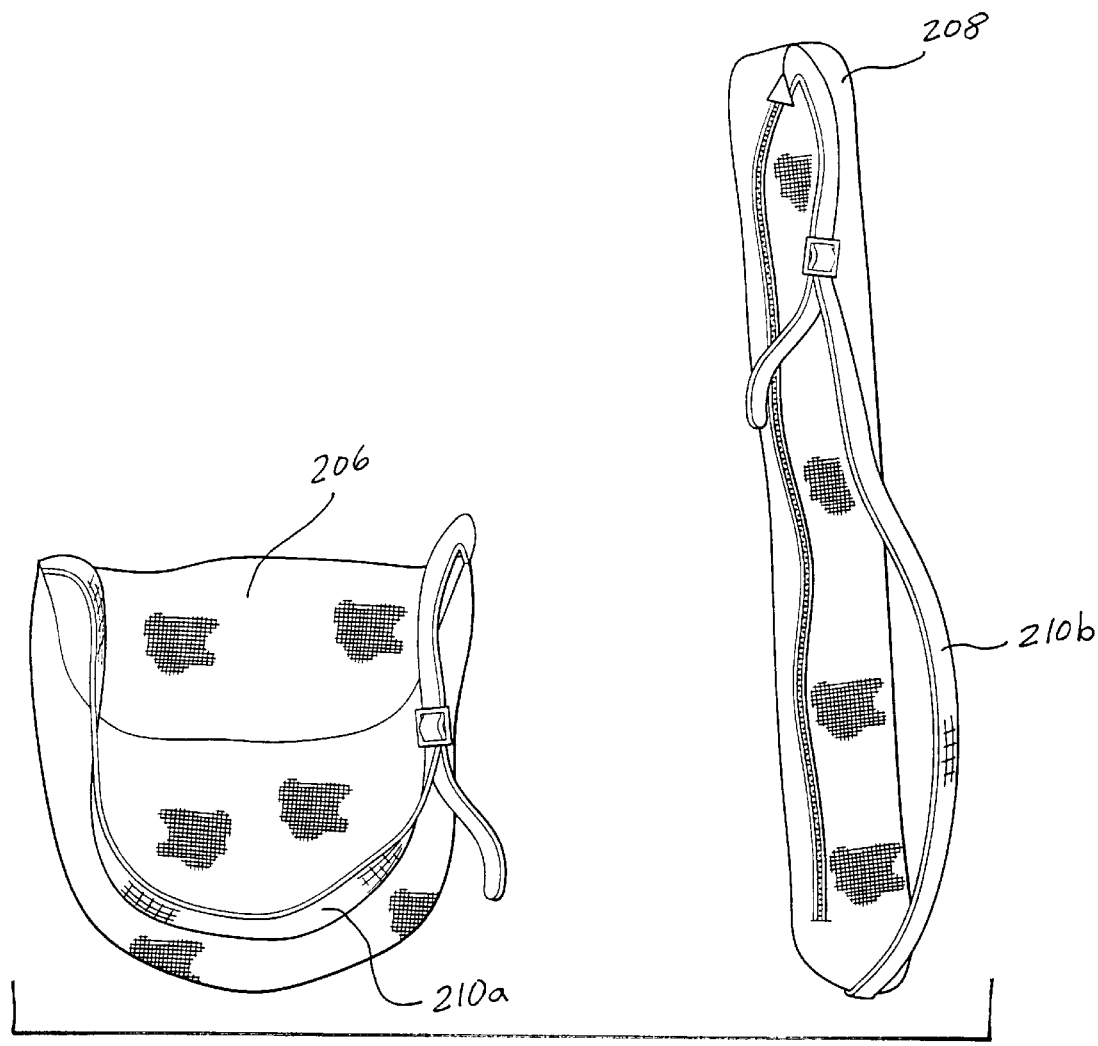
FIG. 9 is a perspective view of the safety ring and stand legs in their respective carrying bags.

The Dutch oven stand assembly 12 is readily assembled and disassembled, and conveniently transported using sturdy carrying bags 206,208 with straps 210a, 210b from one location to another with a minimum amount of time and effort. FIG. 9 is a perspective view of the safety ring (hidden) in its carrying bag 206 and the stand rods (hidden) in their carrying bag 208.

Figure 5:
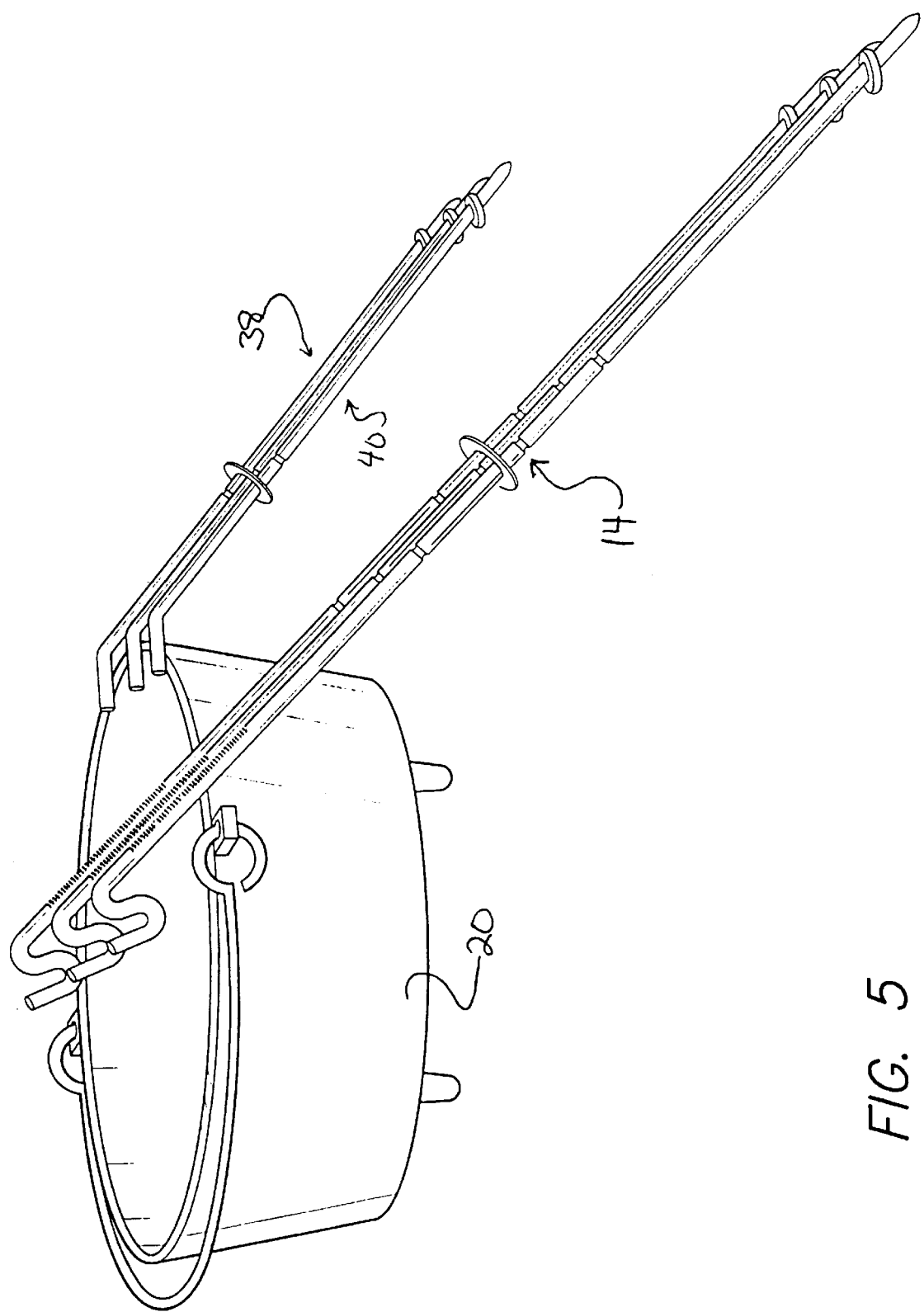
FIG. 5 is a perspective view of the Dutch oven rods in collapsed position.

As shown on the left in FIGS. 1 and 5, miniature tripods 38 and 40, i.e., for supporting pot 20 and lid 21, respectively, are of the same general construction and work in the same essential manner as tripod 14. However, miniature rods 42 used as part of miniature tripods 38 and 40 are preferably ⅜ inches in diameter, and preferably sixteen inches in length. Rods 42 have no saw teeth and are without the S-shaped handle. Pot 20 and lid 21 rest directly on the apex 44 of rods 42.

The novel and innovative Dutch oven stand assembly of the present invention makes dutch oven cooking convenient and comfortable. The Dutch oven stand assembly brings dutch oven cooking to a convenient serving and cooking height. It is completely unnecessary to dig a firepit to enjoy dutch oven cooked food. With the Dutch oven stand assembly of the present invention, food can be dutch oven cooked over grass, pavement, and dirt for a completely delicious Dutch oven meal.

The preferred embodiments of the present invention disclosed herein are intended to be illustrative only and are not intended to limit the scope of the invention. It should be understood by those skilled in the art that various modifications and adaptations of the present invention as well as alternative embodiments of the present invention may be contemplated.

It is to be understood that the present invention is not limited to the sole embodiments described above, but encompasses any and all embodiments within the scope of the following claims.

I claim:

1. A Dutch oven stand assembly, comprising:
   a tripod assembly having three steel rods bound together by a metal ring, each of said rods having a top portion forming an S-shaped handle, an upper portion having a sawtooth segment, a middle portion having a plurality of annular grooves, and a lower portion; and
   a round, flat steel burner plate lockable onto said sawtooth segment of said rods, said plate having a centrally disposed handle.

2. A Dutch oven stand assembly according to claim 1, further including a series of miniature tripod rods.

3. A dutch oven stand assembly according to claim 1, wherein said plurality of annular grooves comprises three grooves defined in each of said rods.

4. A Dutch oven stand assembly according to claim 1, wherein the lower portion of each said rod comprises a disc-shaped shoe and a sharpened stake that extends approximately one inch below the disc-shaped shoe.

5. A Dutch oven stand assembly according to claim 1, wherein the lower portion of each said rod comprises a hard rubber boot.

6. A Dutch oven stand assembly comprising:

a tripod assembly having three steel rods that pass through a metal ring, each of said rods having a top portion forming an S-shaped handle, an upper portion having a sawtooth segment, a middle portion having a plurality of annular grooves, and a lower portion; and a circular safety ring lockable onto the sawtooth segment of said rods.

7. A Dutch oven stand assembly according to claim 6, further comprising:

a barbecue grate; and height adjustment means for adjusting the height of said grade over said safety ring.

8. A Dutch oven stand assembly according to claim 7, wherein said height adjustment means is centrally disposed within said grate and said safety ring.

9. A Dutch oven stand assembly according to claim 8, wherein said height adjustment means comprises a T-shaped threaded rod.

* * * * *